UNITED STATES PATENT OFFICE.

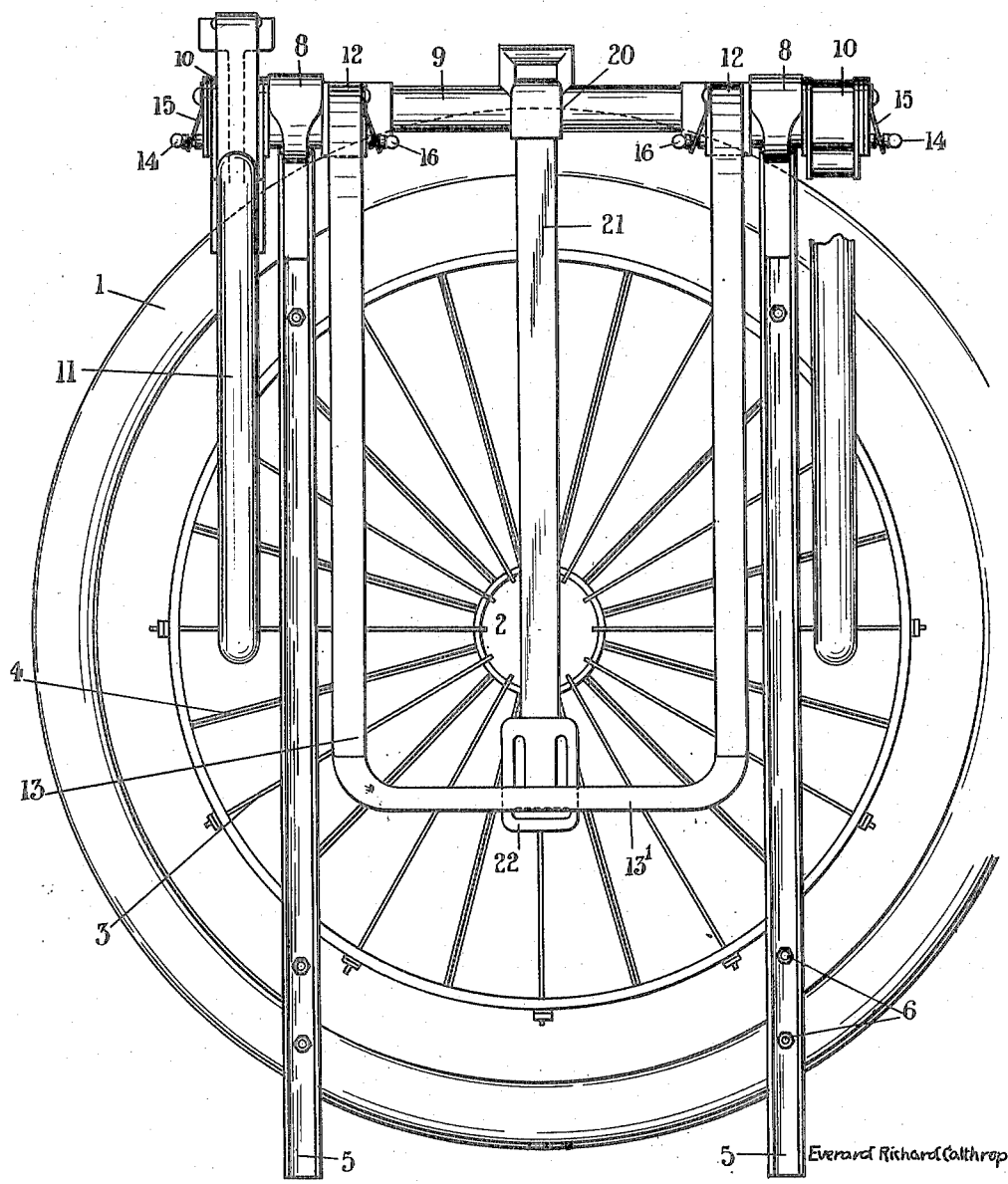

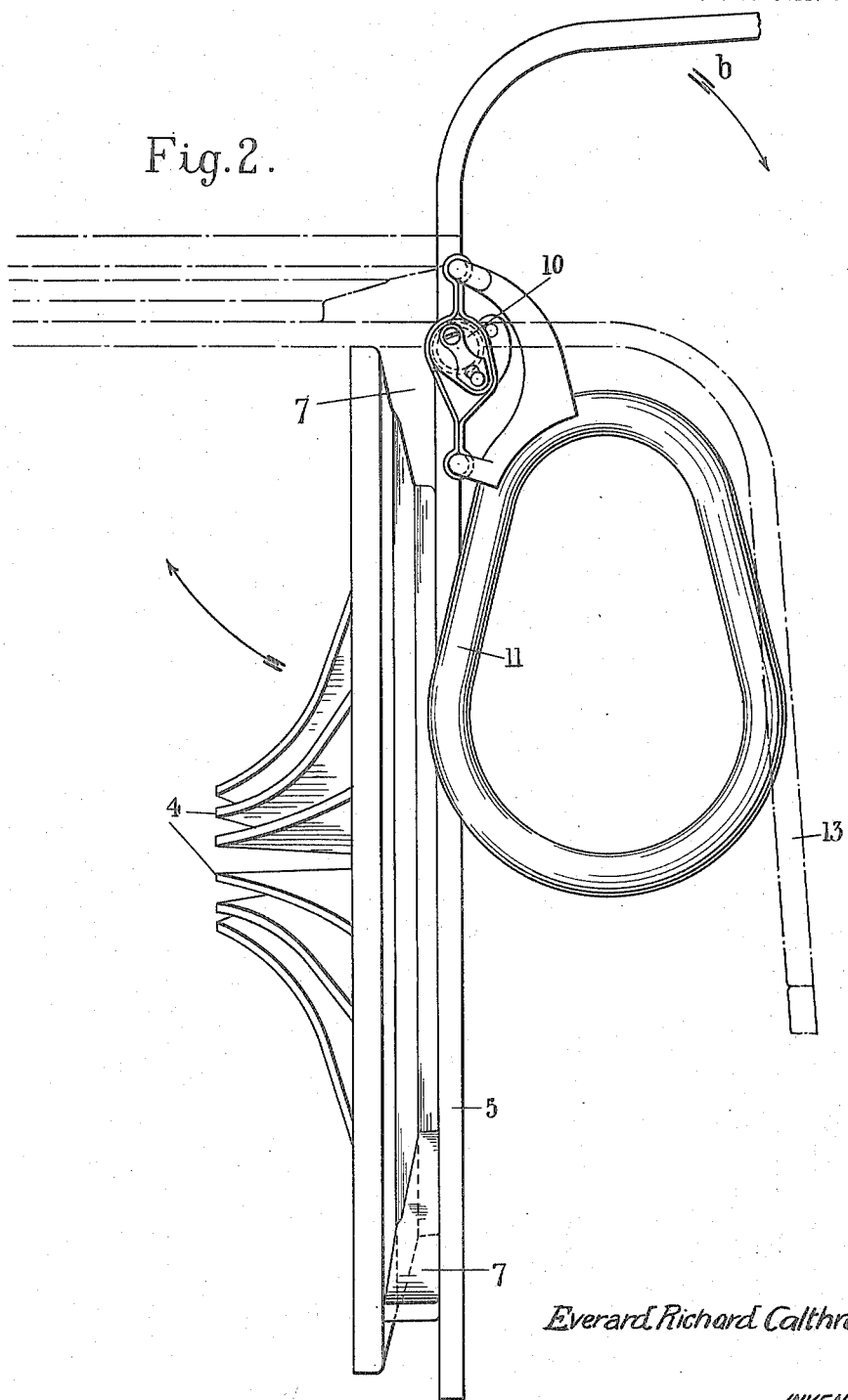

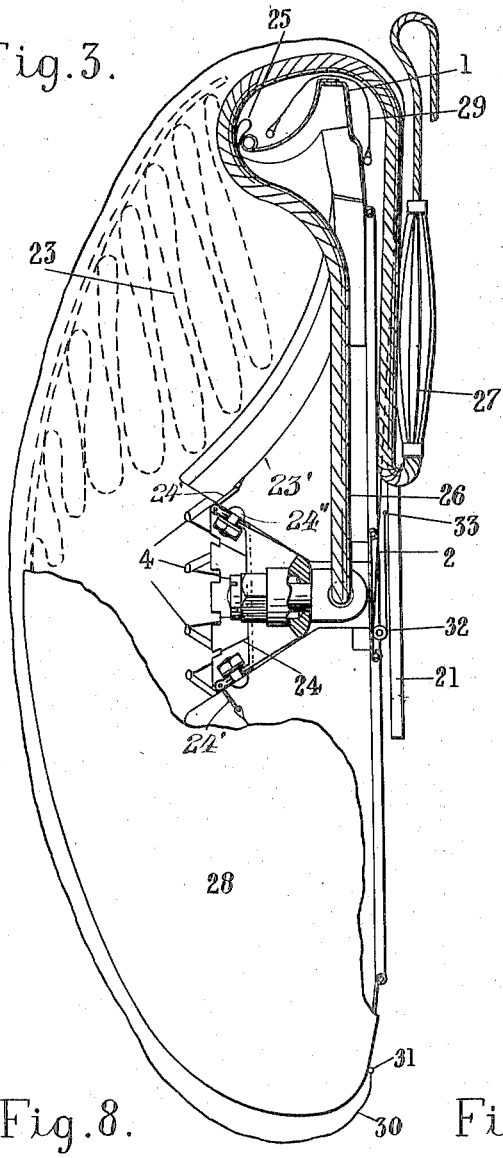

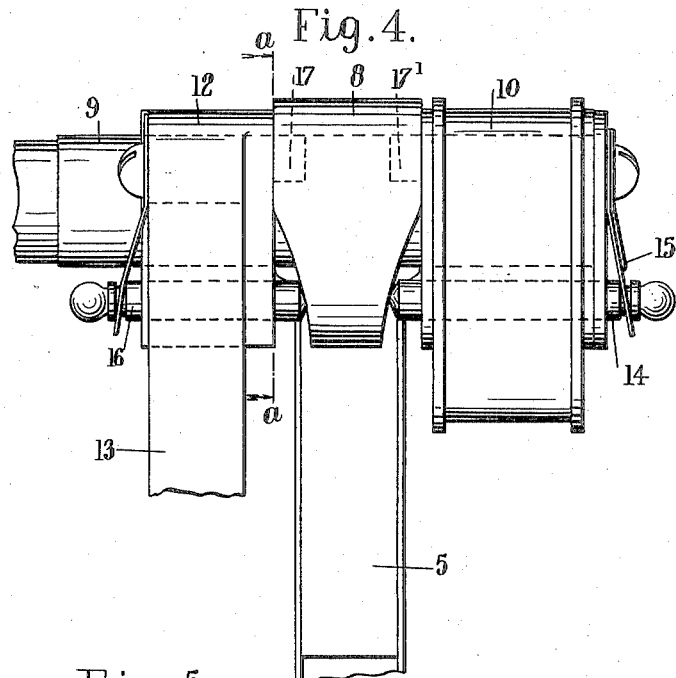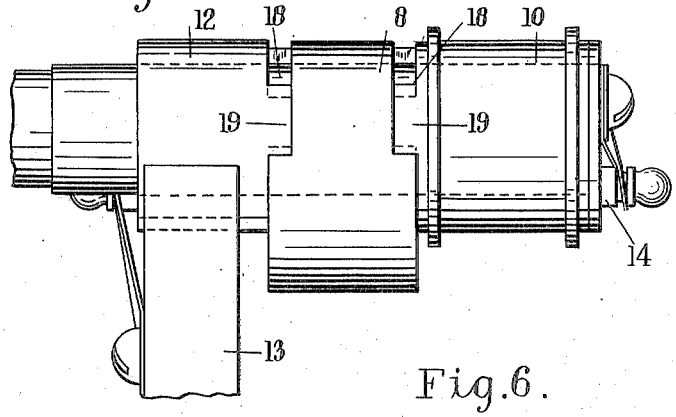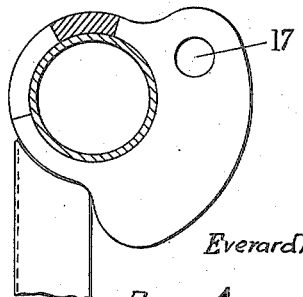

EVERARD RICHARD CALTHROP, OF LONDON, ENGLAND.

PARACHUTE.

1,308,478. Specification of Letters Patent. Patented July 1, 1919.

Application filed November 10, 1916. Serial No. 130,675.

*To all whom it may concern:*

Be it known that I, EVERARD RICHARD CALTHROP, a subject of the King of Great Britain, residing at London, in the county of Middlesex, England, have invented a new and useful Improvement Relating to Parachutes, of which the following is a specification.

This invention has reference to life saving parachutes for the use of aviators, and relates more particularly to parachutes of the kind which are symmetrically folded and plaited to occupy but small space, and are adapted to be launched from a launching disk by the application of the weight of the aviator in such a manner that static and kinetic control of its functions is obtained, to the end that all the parts shall act in ordered sequence and in predetermined paths.

Now the object of my present invention is to provide an improved parachute of the aforesaid type which instead of being attached to an aircraft is adapted to be secured to the person of and carried directly by the aviator and having means whereby it may be so controlled as to be instantly brought into operative position in case of emergency so that the parachute may ascend from its launching disk.

In its broadest aspect my invention may be said to contemplate a construction in which the parachute body and its rigging is compactly arranged on within or around a support which is normally carried directly by the aviator in such a position as to cause the least discomfort to the wearer and like a knapsack to offer the least projection of its bulk means being provided whereby in case of necessity said support may be caused to occupy such a position that as the aviator falls the parachute cover will be expanded and lifted by the uprush of the air current and the rigging automatically extended thus supporting the aviator and permitting of an easy and safe descent.

More specifically considered the invention consists in the provision of a support for the parachute body and its rigging said support being hinged to a suitable attachment secured to the aviator in such a manner that normally it lies flat against the aviator's back but may be caused when a descent is to be made to occupy a position at right angles to the aviator's back so that as the aviator falls the air will pass through the support to the interior of the parachute which will thus be caused to expand and freed and lifted from its support.

The invention further comprises the various details of construction and combination of parts all as hereinafter more particularly described.

In order that my invention may be readily understood and carried into effect I will now proceed to describe the same fully for which purpose reference is to be had to the accompanying drawings in which:

Figure 1 is an elevation of a device embodying my invention.

Fig. 2 is a side elevation thereof.

Fig. 3 is a longitudinal section of the device partly in elevation and drawn to a somewhat smaller scale illustrating the parachute body and its associated parts mounted thereon.

Fig. 4 is an elevation and

Fig. 5 a plan view of the mechanism operated by the elevating levers to be more particularly hereinafter referred to.

Fig. 6 is a section taken along the line $a$—$a$ of Fig. 4.

Figs. 7 and 8 are diagrams to be hereinafter more particularly referred to.

In that embodiment of the invention illustrated the support for the parachute is of skeleton form comprising the annular member 1 and a central portion 2 preferably of spun metal connected by spokes 3 to form a wheel-like structure.

A plurality of radially arranged upstanding plates 4—see Figs. 2 and 3—are also mounted upon the face of said wheel-like structure by bolting them at their lower sides to the annular member 1 and the central portion 2 respectively the purpose of which plates is to form not only a support for the plaited and folded parachute but to direct the air into the interior of said parachute when as will presently be described a descent is made by the aviator. The device so far described constitutes what may for convenience be termed the "launching disk" and will be so referred to hereinafter.

To the back or rear face of the launching disk the two bars 5 are bolted as at 6, blocks 7 being preferably interposed between the member 1 and bars 5 to secure a rigid connection between these parts. The bars 5 carry bosses 8 adapted to rotate about a transverse shaft or spindle 9—see Figs. 4 and 5—to which are positively secured the end bosses 10 which serve for the attachment of the arm-rings 11 to be hereinafter described. Rotatably mounted upon and near each end of the shaft 9 is a boss 12 retained in position on said shaft by a collar 12'. To each of the bosses 12 a bent operating lever 13 is secured whereby the whole device is brought into the operative position as will hereinafter be explained. The ends of the levers 13 are preferably connected by a bar or yoke piece 13'.

The construction of the various parts 8, 10, 12 and 13 and their relation to the shaft 9 will best be understood from an inspection of Fig. 4, 5 and 6. The bosses 10 which as above stated are rigidly secured to the shaft 9 are each provided with a sliding pin 14 adapted to be pressed inwardly against the bosses 8 by a leaf spring 15 while the bosses 12 are provided with a similar spring controlled pin 16. Each boss 8 is formed with a hole 17 adapted when the levers 13 are turned through an angle of about 90° to receive the end of the pin 16 thereby locking the bosses 12 and 8 together. The bosses 8 are also provided with holes 17' to receive the ends of the pin 14 to lock the launching disk in operative position.

In order to limit the amount of movement of the operating levers 13 the bosses 8 are stepped on both sides as at 18 and the bosses 10 and 12 are formed with projections 19 taking into the stepped portions as will be seen on reference to Fig. 5. Keyed at 20 upon the shaft 9 is a bar 21 adapted for attachment to the aviator's sling trapeze or harness such as by the provision of the slotted plate 22.

Referring now to Fig. 3 is will be seen that the parachute body 23 compactly plaited and folded is arranged upon the launching disk 1 and the rigging which is composed of flat tapes 23' arranged in packs 23" is supported and retained in position on said disk and between the upstanding radial plates 4, the ends of said tapes constituting the rigging being secured respectively to the peripheral edge of the parachute body 23 and to a center piece 24 which is adapted to sit snugly in the center of the disk where it is supported by the plates 4 and it is to be noted that the parachute body 23 is so arranged on the launching disk that after its edge is secured to the tape rigging as by eyelets or stitching (not shown) it is laid in symmetric folds toward the apex and is then brought down toward the periphery turned upon itself at that point and led back over the folded and plaited portions the tapes generally assuming a looped form over the peripheral rim 1' as shown at 25. This arrangement of the cover which will be apparent by following the broken lines in Fig. 3 is of considerable importance as it insures the rapid expansion of the parachute when a descent is made. The tapes 23' are attached to the center piece 24 by means of link holders 24' which are secured to the said center piece 24 by the bolts 24".

The main suspension rope 26 of the parachute is connected to the center piece 24 and is then laid between the plates 4 over the edge of the launching disk and the opposite end secured to the aviator's harness a suitable shock absorbing device 27 being preferably interposed.

I prefer to inclose the packed parachute and the launching disk in a two part cover 28, 29 of suitable weather proof material, means to be hereinafter described being provided whereby as the device is brought into operative position said top cover 28 will be automatically stripped off so allowing the parachute to expand. The upstanding peripheral rim 1' (Fig. 3) serves as a ledge for supporting and holding the part 29 of the cover and for enabling the parachute to be readily freed from the launching disk. The part 29 is held against the ledge 1' and the lower side of the annular member 1 by india rubber rings 29'.

I will now proceed to describe the operation of my improved apparatus: The parachute and its associated parts supported upon the launching disk is secured to the back of the aviator knapsack fashion to which end the aviator passes his arms through the arm rings 11 attached to the bosses 10 and the slotted plate 22 carried by the bar 21 is secured to the belt or other suitable portion of the aviator's harness. In this position it will be seen that the operating levers 13 will lie over the aviator's breast and the bar or yoke piece 13' in a convenient position to be grasped by the hands. When a descent is to be made either by reason of an accident occurring to the aircraft or otherwise the aviator jumps from his seat and raises the levers 13 into the position b indicated in Fig. 2 until this movement is arrested by the stepped portion of the bosses 8. As this occurs the spring operated pins 16 will engage the holes 17 in the bosses 8 and thereby lock bosses 12 and 8 together. The levers 13 are now returned to the original position and as the bosses 8 and 12 are connected they will rotate about the shaft 9, and the whole launching disk will be turned upward through 90° and caused to occupy the position indicated in dotted lines in Fig. 2 being locked in such a position by the pins 14 engaging the holes 17' in the bosses 8. As this movement takes place the upper waterproof cover is automatically stripped off and massed behind the aviator's neck to which end a cord or the like 30 is attached to said cover 28 at 31 passed over the cover to a pulley or guide 32 mounted upon the center plate 2 and finally attached to the bar 21 at 33.

The launching disk now occupies a position at right angles to the back of the aviator and as he falls the air entering the interior of the support will first expand the parachute and the packs of tape constituting the rigging will be extended as the parachute body rises above the support due to its fall. When the rigging is fully extended the center piece above referred to will be pulled away from its seat upon the launching disk the rope 26 and shock absorber 27 will be lifted into tension with the aviator harness and the aviator thus safely suspended will descend to the ground.

I may in some circumstances dispense with the locking pin 14 and spring 15 in which case the aviator would hold the yoke piece 13' firmly against his breast until the parachute is clear of the launching disk which it will be understood occurs practically instantaneously. On reaching the ground the aviator will thus be enabled to raise the levers 13 and so disengage himself from the device.

I may in some cases find it advantageous to provide a small pilot parachute 34—see Fig. 7—the cords or rigging 35 being attached to the apex of the main parachute 23 and in order to avoid wastage of air at the time of inflation and expansion of the main parachute the center hole 36 usually provided in a parachute—see Fig. 8—may be covered with a lightly adhering stripping piece 37 attached by means of a cord 38 to one of the seams or reinforcing tapes of the parachute body 23 so that on the full expansion of said body said stripping piece will be torn from the center hole 36 so that its functions in the descent will be unimpaired.

What I claim is:

1. The combination with a parachute of a skeleton or wheel like support for said parachute and its rigging, means for attaching said support and parachute to the back of the wearer and means for releasing and actuating the said support to bring the same into operative position.

2. The combination with a parachute of a skeleton or wheel like support for said parachute and its rigging, means for attaching said support and parachute to the back of the wearer, means for releasing and turning the support through an angle of 90° to bring same into operative position and means for locking said support in the said position preparatively to launching the parachute.

3. A parachute launching device comprising a launching disk adapted to support a parachute and rigging in a compactly plaited and folded condition, means adapted for attachment to the aviator hinged to said launching disk, manually controlled operating levers, and means associated with said levers whereby upon actuation of said levers the launching disk may be raised to a position at right angles to the aviator's back, and means for locking said disk in said position.

4. A parachute launching device comprising a launching disk of skeleton or wheel-like formation adapted to support a parachute and its rigging, radially disposed upstanding plates carried by said disk, members hinged to said disk and adapted for attachment to the aviator, manually controlled operating levers associated with said disk whereby it may be raised to its operative position, means for locking said disk in said raised position, a flexible envelop for inclosing the plaited parachute and its associated parts and the launching device, and means for automatically stripping said envelop as the launching disk is raised to its operative position.

5. The combination with a parachute of a small pilot parachute having its rigging attached near the apex of said main parachute, means for supporting said parachute, means for attaching said support and main parachute to the wearer, and means for raising said support through an angle into its operative position.

6. The combination with a parachute of a lightly adhering stripping piece over the central aperture in said parachute, means for supporting said parachute, means for attaching said support and main parachute to the wearer, means for raising said support through an angle into its operative position, and means for removing said stripping piece on the full expansion of the said parachute.

EVERARD RICHARD CALTHROP.